United States Patent [19]
Nihei et al.

[11] Patent Number: 5,245,232
[45] Date of Patent: Sep. 14, 1993

[54] LINEAR ACTUATOR

[75] Inventors: Hideki Nihei, Hitachioota; Syooichi Kawamata, Hitachi; Hideaki Horie, Hitachi; Shigeki Morinaga, Hitachi; Nobuyoshi Mutoh, Katsuta, all of Japan

[73] Assignee: Hitachi, Ltd., Tokyo, Japan

[21] Appl. No.: 844,780

[22] Filed: Mar. 2, 1992

[30] Foreign Application Priority Data

Mar. 1, 1991 [JP] Japan .................................. 3-036074

[51] Int. Cl.$^5$ ........................................... H02K 41/00
[52] U.S. Cl. ..................................................... 310/12
[58] Field of Search .......................................... 310/12

[56] References Cited
U.S. PATENT DOCUMENTS

| 4,504,750 | 3/1985 | Onodera et al. | 310/12 |
| 4,654,571 | 3/1987 | Hinds | 318/687 |
| 5,091,665 | 2/1992 | Kelly | 310/12 |

FOREIGN PATENT DOCUMENTS

| 174262 | 7/1989 | Japan. | |
| 246761 | 10/1990 | Japan | 310/13 |

Primary Examiner—Steven L. Stephan
Assistant Examiner—Judson H. Jones
Attorney, Agent, or Firm—Antonelli, Terry, Stout & Kraus

[57] ABSTRACT

A linear actuator for e.g. a disk drive has a fixed member and a movable member. One of those members carries at least one track of permanent magnets extending in the direction in which the movable member is to move, with adjacent permanent magnets having alternate magnetic polarity. The other member has first and second drive parts, each having at least one pair of opposing sets of teeth. The moveable member or each track passes between those teeth. Each pair of teeth is associated with a corresponding drive coil giving the teeth a magnetic polarity so that there is a magnetic alignment between a polarity of the teeth and the permanent magnets. The drive parts are arranged so that, for any given relative position of the first and second members, the magnetic alignment of the teeth of one drive part is out of phase with the magnetic alignment of the teeth of the other part. In order to ensure that the magnetic alignments are out of phase, there may be a physical displacement between the teeth of the two drive parts. This displacement may be $(m \pm \frac{1}{2}) \cdot T_p$, where m is an integer and $T_p$ is the teeth pitch. This gives a phase displacement of 180°. Alternatively, the drive parts may be aligned, and two tracks of permanent magnets be provided with the magnets thereof having opposite polarity for a given track position, or the drive current to the drive coils may be controlled to be out of phase.

22 Claims, 8 Drawing Sheets

$(q \pm 1/4) \cdot T_p$

LINEAR ACTUATOR

BACKGROUND OF THE INVENTION

1. Field of the Invention

The present invention relates to a linear actuator it is particularly concerned with a linear actuator for use in a disk unit, but the present invention is not restricted to disk units, and the linear actuator of the present invention may be used for other purposes, such as in a graphical plotter, printer, or semiconductor mounting device.

2. Summary of the Prior Art

In a disk drive, a disk (optical disk, magnetic disk) is supported for rotation by a suitable support, and the unit also has a head for reading or writing information to the disk. The head is movable linearly so that the combination of disk rotation and head movement permits the whole of the disk to be scanned by the head. It is therefore necessary to provide a linear actuator for moving the head towards or away from the axis of rotation of the disk.

The standard method of forming a linear actuator for this purpose makes use of voice coil motors. In such an arrangement, one or more coils are used to generate a magnetic field, and changes in that magnetic field cause a movable member to move, the movable member being connected to the head. Normally, such an arrangement is also provided with guide rails forming at least one linear guide for guiding the relative movement of the movable member, and hence the head, relative to the rest of the disk unit.

There is a desire to reduce the size of disk units, and the size of the linear actuator is increasingly significant in determining the overall size of the disk unit. With a linear actuator based on voice coil motors, as discussed above, the driving force per unit volume of the coils is small, and hence relatively large coils are needed. Furthermore, at least that part or parts of the movable member which interact with the magnetic fields of the coils needs to be heavy, so that high-speed movement is difficult. The need for large coils is particularly serious when attempts are made to reduce the size of the disk drive, since, in practice, a linear actuator involving voice coil motors has minimum thickness of about 15 to 16 mm, if suitable drive forces are to be generated, whereas it is desirable to reduce the thickness of the disk unit to e.g. 5 to 6 mm.

Therefore, consideration has been given to the use of linear pulse motors. A standard type of linear pulse motor, known as the "hybrid type", involves two members each with at least one set of teeth with a predetermined tooth spacing pitch and each set of teeth being magnetically associated with a drive coil for generating magnetic fields. The two members are arranged so that the teeth of one member oppose the other, and by controlling and varying the drive current to the coils, and hence the magnetic polarity of the teeth, the two members may be caused to move. In such an arrangement, the parts of the members which form the teeth are normally iron. It is relatively easy to make such a hybrid type linear pulse motor relatively thin, but the arrangement has a high inductance, giving a slow response time, and the fact that both the fixed member and the movable member have teeth makes the linear actuator difficult to construct.

Therefore, proposals have been made to make use of a permanent magnet (PM) type linear pulse motor, in which one of the members carries at least one track of permanent magnets, with those magnets being arranged so that adjacent magnets have opposite magnetic polarity.

JP-A-1-174262 (corresponding to U.S. Pat. No. 4,945,268) proposed a linear actuator for use in e.g. a disk unit, in which one member had a track of permanent magnets described above, and there was then a drive part having pairs of sets of teeth with the track of permanent magnets being interposed between the sets of teeth.

This idea was also considered in JP-A-2-246761 (although there was no disclosure in that document of application to a disk unit) in which there were two tracks of permanent magnets, and first and second drive parts. One drive part was arranged so that the drive coils thereof were on one side of the member carrying the tracks, and those drive coils were connected to two pairs of sets of teeth with one track being interposed between those sets of teeth. The drive coils of the other drive part were arranged on the opposite side of the member carrying the track of permanent magnets, again with those drive coils being magnetically connected to pairs of sets of teeth the second track then being interposed between those sets of teeth of the other drive part.

In JP-A-2-246761, the two drive parts were arranged so that they were aligned in a direction perpendicular to the direction of extension of the tracks of permanent magnets, and the magnetic poles of the tracks of permanent magnets were similarly aligned. It was disclosed, however, that the direction of the sets of teeth could be skewed relative to the direction of extension of the tracks of permanent magnets.

SUMMARY OF THE INVENTION

The present invention seeks to develop further the idea of forming a linear actuator using a permanent magnet type linear pulse motor, and, in particular, considers the question of the size of the linear actuator. It is considered desirable for the actuator to be reduced and the present invention addresses this problem.

In a first aspect, it is proposed that the first and second drive parts are arranged such that the magnetic alignment of the sets of teeth of one drive part, or a first track of permanent magnets, and the magnetic alignment of the sets of teeth of the other drive part or a second track of magnets, are out of phase with one another. In this first aspect, the drive parts are arranged so that the drive coils of the respective drive parts are on opposite sides of the member carrying the track or tracks of permanent magnets.

There are several ways of achieving the difference in phase between the magnetic alignment of the respective drive parts and associated tracks(s). These different alternatives represent different developments of this first aspect of the present invention. The majority of these developments involve physical aspects of the alignment, so that there is a displacement distance between the physical alignments which is a non-integral multiple of the pitch of the teeth. It is also possible, however, for this effect to be achieved by controlling the phases of the drives to the drive parts so that they are out of phase.

Each drive part may itself comprise one or more pairs of sets of teeth, with associated drive coils. Thus, in JP-A-2-246761, although each drive part has two pairs of teeth, and two drive coils associated therewith, pairs of teeth on opposite sides of the member carrying the tracks of permanent magnets are aligned and thus the phase relationship between the teeth and permanent magnets is the same on the two sides of the member carrying the tracks of permanent magnets.

In this first aspect, however, the drive parts must have their drive coil, or coils, on opposite sides of the member carrying the track, or tracks, of the permanent magnet.

This first aspect of the present invention itself has a number of sub-aspects. In a first sub-aspects, there is only one track, and preferably each drive part has only one pair of sets of teeth. In such an arrangement, it is possible for the two drive parts to be arranged so that the pair of sets of teeth of one drive part are at a different position along the track from the pair of sets of teeth of the other drive part, so that the sets of teeth may be displaced along the track by distance greater than the width of one of the sets of teeth. In this way, it is possible for the first and second drive parts to overlap in a direction perpendicular to the direction of extension of the magnetic track, so that the overall size of the linear actuator may thus be reduced.

In particular, the displacement distance is preferable $(m\pm\frac{1}{4})\cdot T_p$, where n is an integer (including zero) and $T_p$ is the pitch of the teeth.

The second sub-aspect proposes that there are two tracks with two drive parts acting on respective tracks. Then, this second sub-aspect, the difference in the alignment of the drive parts with the respective tracks is such that drive force generated is 180° out of phase. This provides a greater drive force for a given drive current, permitting smaller drive coils to be used for a given drive force. This 180° phase displacement may be expressed in terms of the pitch of the teeth, so that the displacement distance is $(m\pm\frac{1}{4})\cdot T_p$, where m is an integer (including zero) and $T_p$ is the pitch of the teeth. There are two alternative ways of achieving such a displacement distance. Firstly, in a manner similar to the first sub-aspect, the pairs of teeth of one drive part may be displaced relative to the pairs of teeth of the other drive part in the direction of extension of the tracks of permanent magnets. The actual displacement is different, and more than one track is involved.

However, it is also possible to achieve the displacement distance by displacing the magnetic poles of one track relative to the other. In such an arrangement, the pitch of the teeth normally corresponds to one pair of adjacent magnetic poles along the track, and thus this displacement may be considered equivalent to reversing the polarity of one track relative to the other.

The 180° phase difference may also be achieved by suitable control of the drives to the drive part, and the second sub-aspect includes arrangements in which there is no difference in the physical alignment, but only in the drive phase relationship.

It has also been realized that the principle of the second sub-aspect, namely arranging for the alignment to have a displacement distance corresponding to a 180° phase difference, represents a second, independent aspect of the present invention. In that second aspect, it is possible to use two tracks, and have the drive coils of the two drive parts arranged on opposite sides of the member carrying the tracks of permanent magnets, in which case the second aspect becomes identical to the second sub-aspect of the first aspect, as discussed above. However, it is not necessary in this second aspect that the drive coils of the two drive parts be arranged on opposite sides of the member carrying the tracks of permanent magnets, and it is possible to make use of a single track, with the drive coils of the two drive parts arranged on the same side thereof. In such an arrangement, the width of the linear actuator, transverse to the track, may be reduced.

Again, in this second aspect of the present invention, the phase difference may be achieved by physical displacement by a suitable displacement distance, or may be achieved by phase control of the drive to the drive parts.

In all the above the of aspects present invention, each drive part may itself comprise a plurality of pairs of sets of teeth, and associated drive coils. In such a case, the spacing between the pairs of sets of teeth should be $(q\pm\frac{1}{4})\cdot T_p$, where q is an integer (including zero) and $T_p$ is the pitch of the teeth. Alternatively, this can be achieved by any suitable spacing if associated with phase control to give a phase displacement equivalent to a physical spacing of $(q\pm\frac{1}{4})\cdot T_p$.

In all the above discussion, where reference has been made to an integer, that integer may be zero or negative as the latter merely indicates a displacement in the opposite direction.

In general, all the aspects of the present invention discussed above, the member including the drive parts will be fixed, and the member carrying the track or tracks of permanent magnets will be movable. Such an arrangement is normally easier to manufacture, and will have a lower inertia. However, it is also possible for the member carrying the tracks to be fixed and for the member carrying the drive parts to be moveable. It is the relative movement of the two members which is important.

In a linear actuator according to all the aspects of the present invention, it is normally desirable to provide linear guides for guiding the movement of whichever of the members is movable, in order to prevent contact between the tracks of permanent magnets and the teeth of the drive parts. Such contact may cause friction or damage. Furthermore, it is normally desirable to provide means for detecting the relative position of the two members, so that the movement thereof can be controlled accurately by controlling the drive currents to the drive parts in dependence upon the relative position.

The present invention is particularly applicable to a disk unit in which the head for reading or writing to the disk is mounted on the movable member and may therefore be moved linearly relative to the disk support, and hence the disk itself. However, the present invention is not limited to this purpose, and a linear actuator according to the present invention may be used in a graphical plotter, a semiconductor mounting device or any other arrangement in which linear movement is required.

BRIEF DESCRIPTION OF THE DRAWINGS

Embodiments of the present invention will now be described in detail, by way of example, with reference to the accompanying drawings, in which.

DETAILED DESCRIPTION OF THE PREFERRED EMBODIMENT

Figure 1:
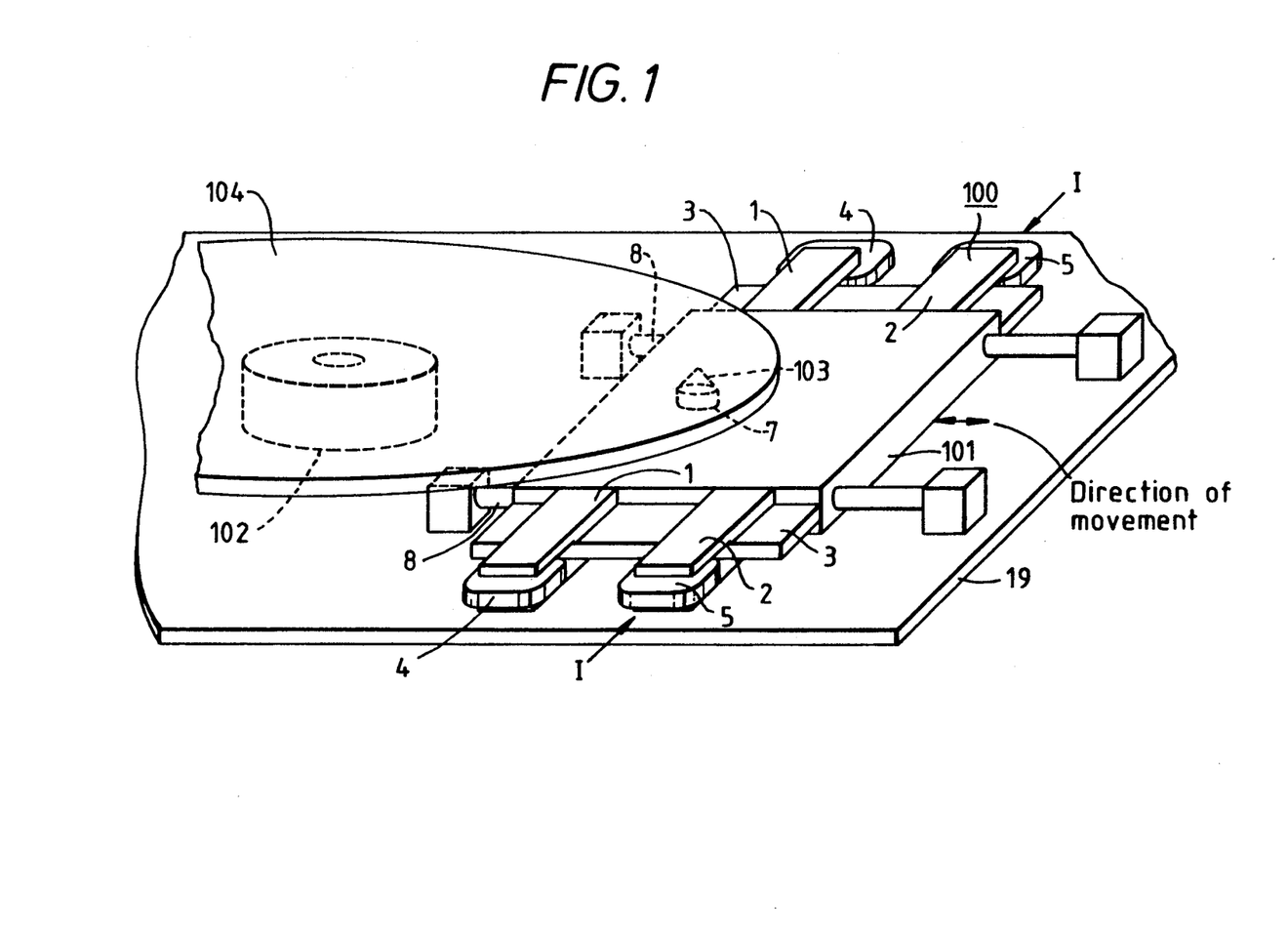
FIG. 1 shows an optical disk unit having a linear actuator, an embodiment of the present invention.

FIG. 1 illustrates an optical disk unit including a linear actuator embodying the present invention. The optical disk unit comprises an optical disk 104 for recording and/or reproducing data, a spindle motor 102 for rotating the optical disk, an optical head 7 located under the optical disk 104, a linear actuator 100 acting as a head feed mechanism for moving the optical head 7 in the radial direction of the optical disk 104, and a base 19 on which the spindle motor 102 and linear actuators 100 are mounted. The optical head 7 is moved by the linear actuator 100 in a radial direction of the optical disk 104 and a light beam 103 moves between optical disk tracks, thus allowing data to be recorded on or reproduced from the whole surface of the optical disk 104.

The linear actuator 100 has tracks of permanent magnets 3 on movable members 101 thereof, on respective sides of the optical head 7, with the optical head 7 being centrally located on the movable member 101 body centered. Each track permanent magnet 3 is associated with a corresponding drive part, each drive part having torque thrust throughout stators A, B to produce a drive thrust. Stator A is the combination of an A-phase coil 4 and an A-phase stator core 1, whereas stator B is the combination of a B-phase coil 5 and a B-phase stator core 2. These two drive parts are formed on opposite sides of the movable member, each drive having both A and B coils and cores. Moreover, there are linear guides 8 on opposite sides of the moveable member 101.

Figure 2:
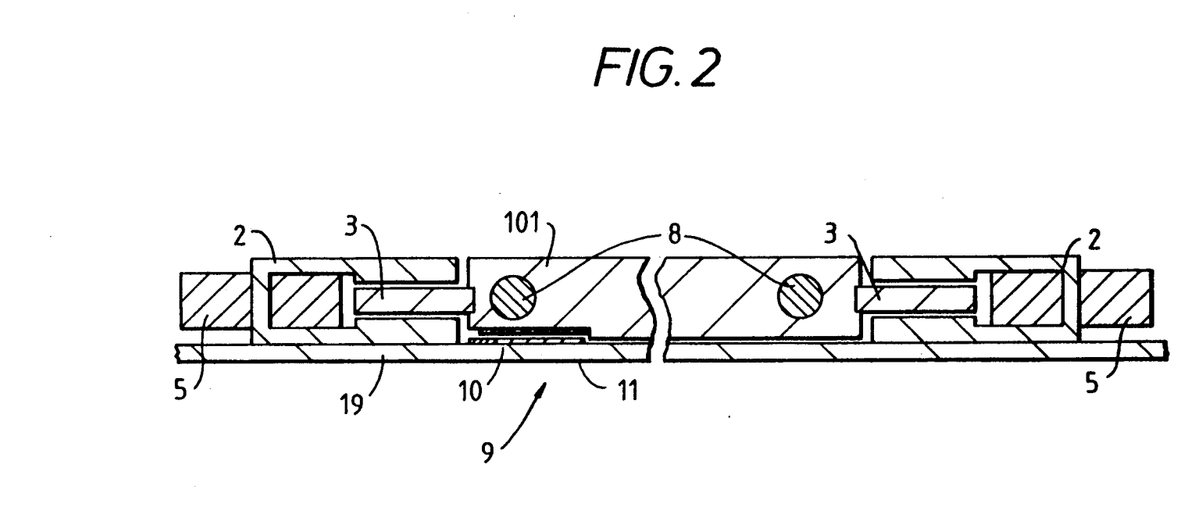
FIG. 2 is a sectional view of the linear actuators of the embodiment in FIG. 1.

FIG. 2 is a sectional view taken along the line I—I of the linear actuator of the optical disk unit shown in FIG. 1. The A-phase stator core 1 and the B-phase stator core 2 are both secured to the base 19. There is also a magnetic sensor 10 of a linear position sensor 9 on the same base 19 and a magnetic plate 11 is mounted on a lower part of the moveable member 101, the magnetic sensor 10 and the magnetic plate 11 facing each other with a very small gap therebetween.

The moveable member 101 is supported by the linear guides 8 and is movable without contact with the base 19. Moreover, the permanent magnets 3 are fixedly fitted into recesses provided in respective side walls of the main body of the movable member 101. As the two linear guides 8 supporting the movable member 101 are thus located on a line connecting the tracks of permanent magnets 3 of the movable member 101, and are secured to the respective sides walls of the movable member 101, parallel thrusts of the same magnitude are exerted on both outer sides of the movable member 101 and the linear guides 8. Consequently, there should be no vibration due to imbalance of forces. In addition, because no vertical forces are produced at the gap where the thrust is generated, the center of gravity of the optical head 7 and the sliding surface of the linear guide are substantially on the same plane.

As the permanent magnets 3 are fixedly fitted into the recesses provided in the main body of the movable member 101, its inclination in the vertical direction can be inhibited by the recesses. Therefore, assembly precision can readily be achieved.

Figure 3:
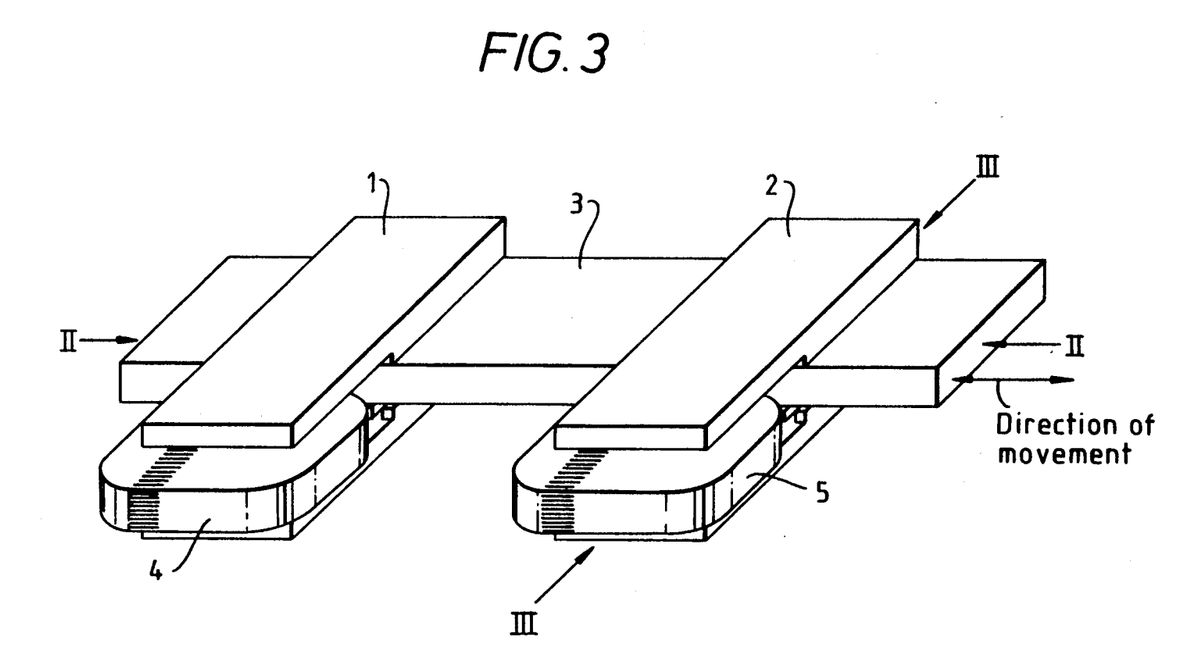
FIG. 3 shows the basic principal construction of a drive part of a linear actuator according to the present invention.

FIG. 3 shows the basic construction of one drive part of the linear actuator shown in FIG. 1. FIG. 4 is a sectional view of the construction. The drive part has two-phase stators A, B which interact with the movable member 101 (see FIG. 1): the stator A has the A-phase stator core 1 with the A-phase coil 4 wound thereon; and the stator B has the B-phase stator core 2 with the B-phase coil 5 wound thereon. The movable member has a track of permanent magnets 3.

Figure 4A:
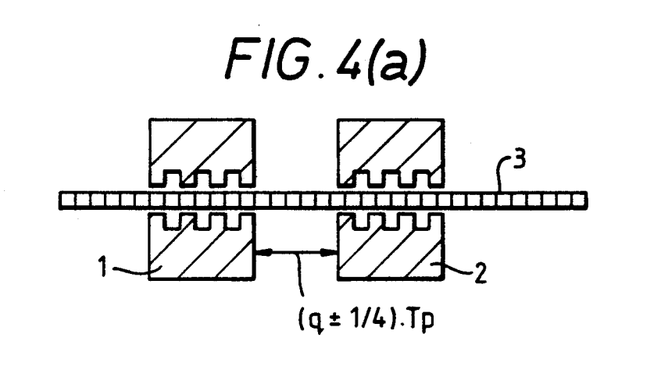
FIGS. 4(a) to 4(c) are sectional views showing the basic construction of a drive part of a linear actuator according to the present invention.

FIG. 4(a) is a sectional view along the line II—II in FIG. 3. It can be seen that there are a plurality of stator cores A, B, each having a plurality of core magnetic pole teeth in pairs of sets of teeth, with the track of permanent magnets 3 passing between the pairs so that the permanent magnets of the movable member 101 are held between that member 101 and the teeth. The A-phase stator core 1 is shifted by $(q\pm\frac{1}{4})\cdot T_p$ (q=integer) from the B-phase stator core 2 in terms of the tooth pitch Tp, so that the electrical phases are shifted from each other by 90 degrees.

Figure 4B:
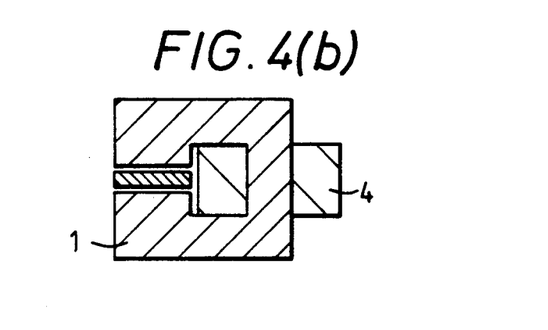

FIG. 4(b) is a sectional view taken along line III—III in FIG. 3. The A-phase stator core 1 is U-shaped and the A-phase coil 4 is wound on the core for generating magnetic flux from the core magnetic pole teeth.

Figure 4C:
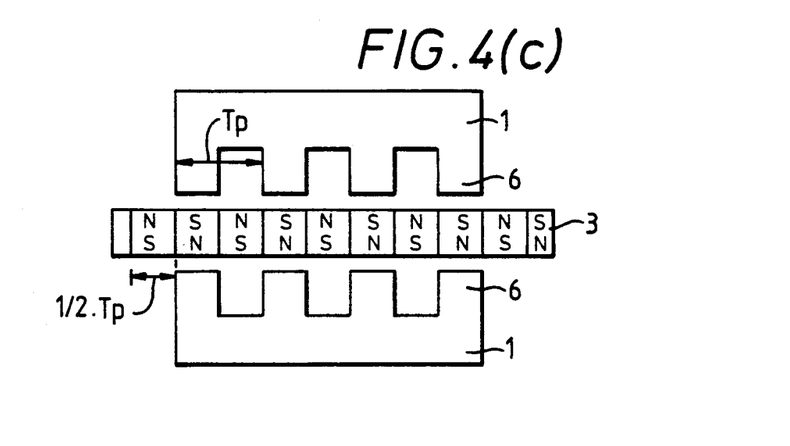

FIG. 4(c) is an enlarged view of the gap shown in FIG. 4(a). The movable member 101 is seen to have a track of plate permanent magnets 3 with the N and S poles alternately arranged in the direction of movement. The width of each permanent magnet is $\frac{1}{2}\cdot T_p$ relative to the pitch of the stator core magnetic pole teeth 6. Therefore, the magnetizing pitch Tp is equal to the pitch of the teeth 6.

As the movable member includes only permanent magnets, and not electromagnets, it can be made as thin as 1.2 mm. The thrust performance can be improved by decreasing the pitch Tp since the thrust is proportional to $\Phi\cdot 2\pi/T_p$, where $\Phi$ is coil interlinkage magnetic flux and the disk unit can be smaller in size accordingly.

It should be noted that, in operation, the alternating currents flowing in the coils of the stators A,B are different in phase.

Figure 5:
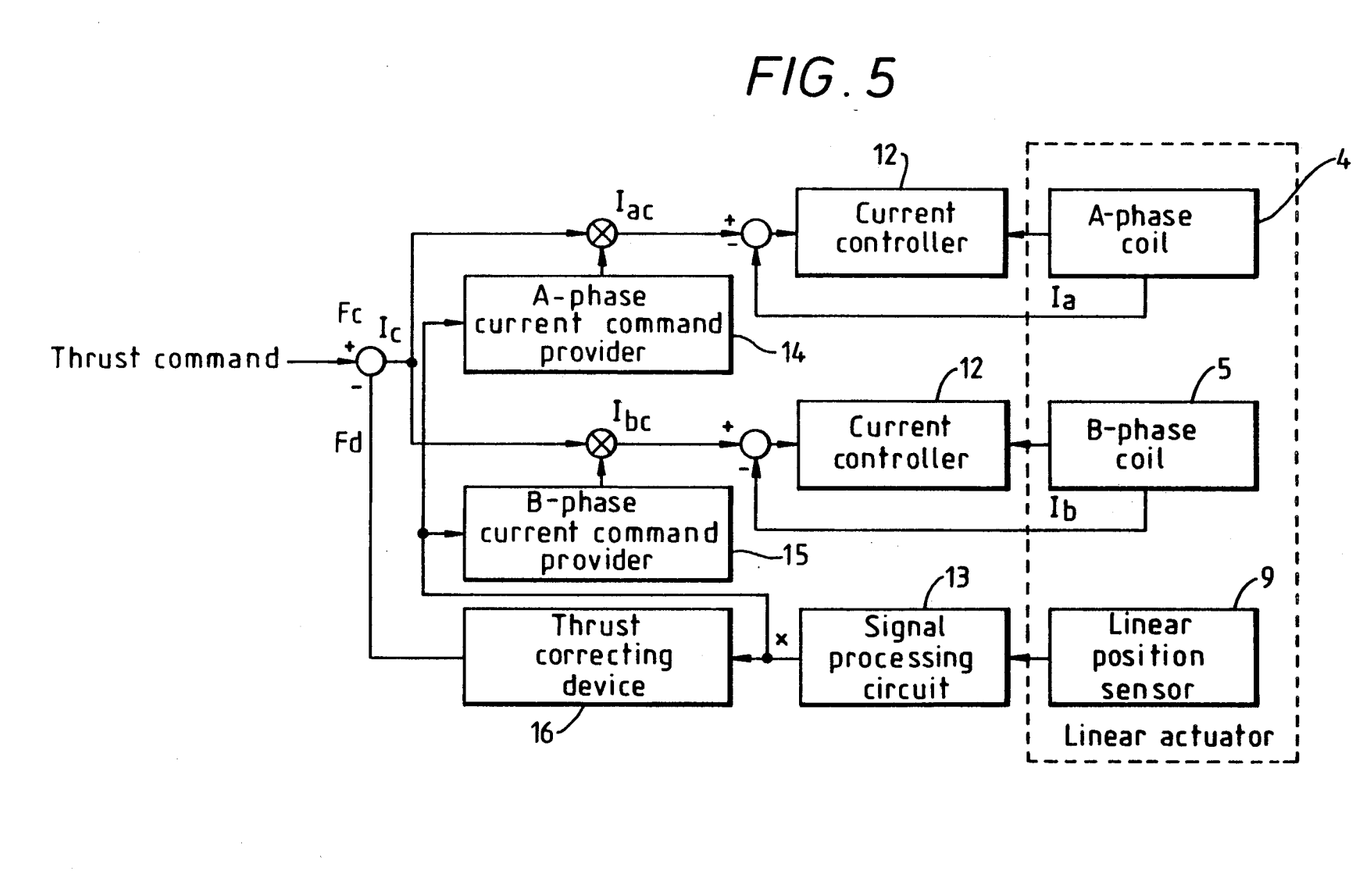
FIG. 5 is a block diagram of a linear actuator driving circuit according to the present invention.

FIG. 5 is a block diagram of a circuit for driving the linear actuator embodying the present invention. A signal from the linear position sensor 9 is converted into a position signal x in a signal processing circuit 13. A thrust corrected value Fd is produced by a thrust correcting device 16 from the position signal x and added to a thrust command Fc so as to produce a current amplitude command value Ic in which the variation of the thrust is corrected. The product of the current amplitude value Ic and a sine wave signal $\sin(2\pi/T_p\cdot x)$ corresponds to an A-phase current command Iac, and the product of the current amplitude value Ic and a sine wave signal $-\cos(2\pi/T_p\cdot x)$ corresponds to a B-phase current command Ibc. These commands are input to a current controller (ACR) 12 for controlling the current Ia of the A-phase coil 4 of the linear actuator in accordance with the A-phase current command Iac, and to a current controller (ACR) 12 for controlling the current Ib of the B-phase coil 4 thereof in accordance with the B-phase current command Ibc, respectively.

As the thrust constant of each stator varies by a sine wave function of the period of the tooth pitch Tp with respect to the position, the thrust on the A-phase side varies with a squared sine wave through such a control, whereas the thrust on the B-phase side varies with a squared cosine wave therethrough. The resultant force becomes constant, independent of position.

Moreover, a signal for correcting the thrust variation due to the load or the position of the actuator itself may be added to the thrust command as a thrust correcting value. Therefore, the thrust variation may be minimized.

As described above, a linear actuator is used in a head feed mechanism of the embodiment. Consequently, it becomes possible to reduce the size and weight of the whole optical disk unit and to provide a quick and responsive head movement by virtue of the light weight of the movable parts. By mounting the head 7 on a rigid movable member 101, providing tracks of permanent magnets and associated drive parts on both sides of the movable member 101, angular moment of the movable member 101 can be suppressed, thereby improving head positioning accuracy. In addition, as the two linear guides for supporting the head are located on the line connecting the tracks of permanent magnets located at respective sides of the head, vibrations in the direction of movement of the movable member 101 can be suppressed. Furthermore, the use of a magnetic sensor for detecting the position of the movable member 101 permits the device to be made thinner than the embodiment employing an optical sensor, and the magnetic sensor assists in ensuring that the thrusts of the actuator are constant by controlling the currents supplied to the coils 4,5 in dependence on the position detection signal. This has the effect of ensuring a speedier, more accurate movement of the head.

Although the tracks of permanent magnets and associated drive parts are arranged on opposite sides of the movable member 101 in the embodiment shown, the object of reducing the size and increasing the rigidity can be accomplished by locating such drive parts on only one side of the movable member 101. An embodiment illustrating this will be described in more detail later.

In the above description, the relative alignment of the tracks of permanent magnets, and the drive parts have not been discussed. As was mentioned earlier, the present invention discloses that there is a displacement in the alignment of the two drive means relative to the associated track or tracks. As was also mentioned earlier, such displacement may take one of several forms, and the subsequent description will consider these forms. In general, all such arrangements permit the linear actuator 100 to be smaller in at least one direction than existing arrangements.

Figure 6A:
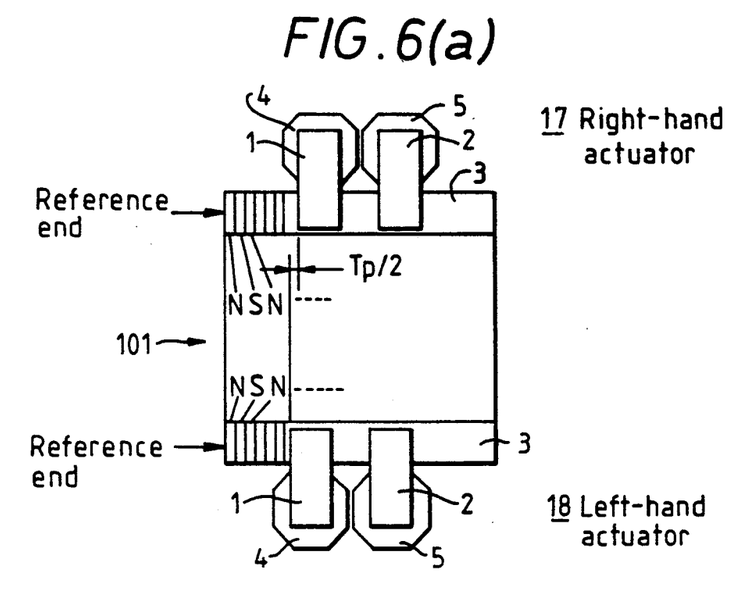
FIG. 6(a) and 6(b) shows in more detail the alignments within a linear actuator of an embodiment of the present invention.

FIG. 6 illustrates a construction which permits reduction of a detent force in a linear actuator embodying the present invention in addition to permitting a size reduction. FIG. 6(a) is a top view of the device of FIG. 1. The tracks permanent magnets 3 on both sides of the movable member 101 are arranged so that the same polarities (N poles) of the magnets are in alignment with each other, with the reference ends of magnetization thereof directed in the same direction. The A-phase stator core 1 of the actuator 17 on the right-hand side of the movable member 101 is shifted by a displacement distance being Tp/2 when $T_p$ is the tooth pitch from the A-phase stator core 1 of the actuator 18 on the left-hand side thereof.

Figure 6B:
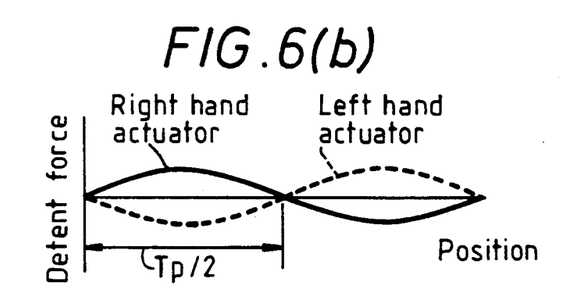

FIG. 6(b) shows the variation of the detent force varying with the position originating from the component in the movement direction of the magnetic attracting force between the tracks of permanent magnets 3 and the stator core of each phase. As the detent force is expressed by the positional change amount of the squared distribution of magnetic flux in the gap, the detent force in each phase appears as a component with a period corresponding to ½ the pitch Tp, assuming the magnetic flux varies in a sine wave. As the A-phase is shifted by ¼·Tp from the B-phase, moreover, the detent forces are opposite to each other in phase and therefore cancel out. However, when the thickness of the tracks of permanent magnets 3 is of the order of 1 mm, it will be difficult to equalize the magnetizing widths and intensities of both N and S poles if the magnetizing pitch is set to an order of 1 mm. Further, the magnetization widths and intensities on one side become greater than those on the other. As a result, the distribution of magnetic flux on the surface of the permanent magnets 3 behave as if a d.c. component has been added. Components of a period Tp are thereby produced in the detent forces in both phases and the detent forces will remain even after summing the forces in the A- and B-phases.

The detent forces can be cancelled by shifting one phase from the other by ½ Tp as in the case of this embodiment. Moreover, the same constant thrust as described above may be obtained by shifting the supplied currents by ½ Tp between the A- and B-phase, that is, one current is opposite to the other in phase.

Such an embodiment thus corresponds to that shown in FIG. 1, with both the magnetic tracks 3, and both the A-phase stator core 1 and the B-phase stator core 2 aligned on each side of the movable member 101. Thus, the physical displacements shown in the embodiments of FIGS. 6 and 7 become unnecessary. However, it is then necessary to control the phases of the A-phase and B-phase coils 4, 5, respectively, so that the drive currents of those coils 4,5 on one side of the movable member 101 are 180° out of phase with the drive coils on the other side of the movable member. This then achieves the same effect as shown in FIG. 6b.

Figure 7:
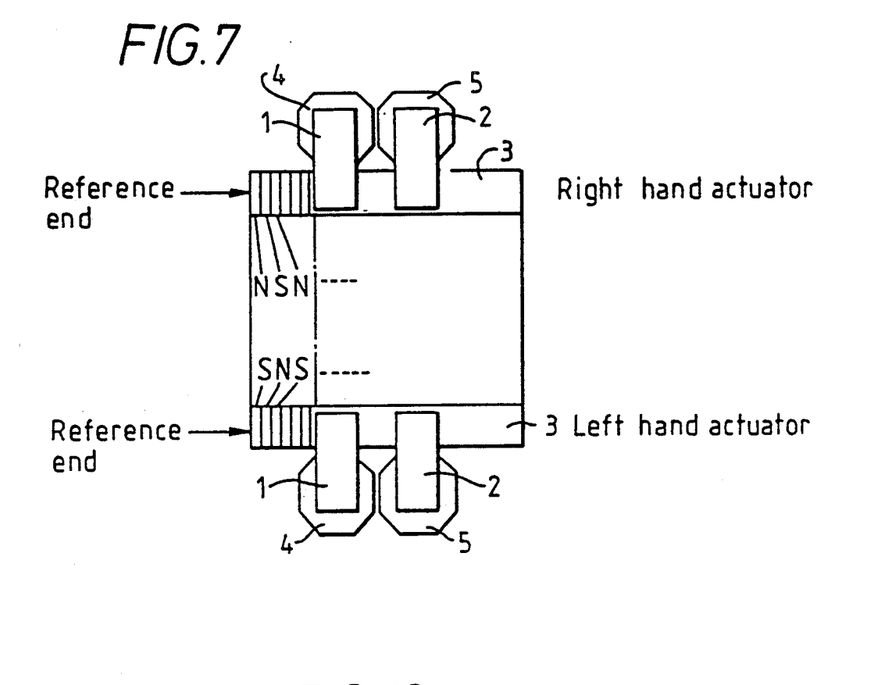
FIG. 7 shows another alignment arrangement in a linear actuator embodying the present invention.

FIG. 7 illustrates another construction for reducing detent forces in a linear actuator of another embodiment of the present invention. Unlike the embodiment shown in FIG. 6, the position of the drive parts are not shifted on the stator side. Instead, the polarities of the permanent magnets 3 on one side are opposite to the other side, whereby the same effect as in the case of FIG. 6 is also obtained.

Thus, in FIGS. 6 and 7, the alignment of the respective drive parts, and the tracks associated therewith, is different.

In both the embodiments of FIGS. 6 and 7, there are tracks of permanent magnets 3 on each side of the movable member 101, and respective drive parts are associated with each track. However, as mentioned previously, it is also possible for the drive parts to act on a single track.

Figure 8:
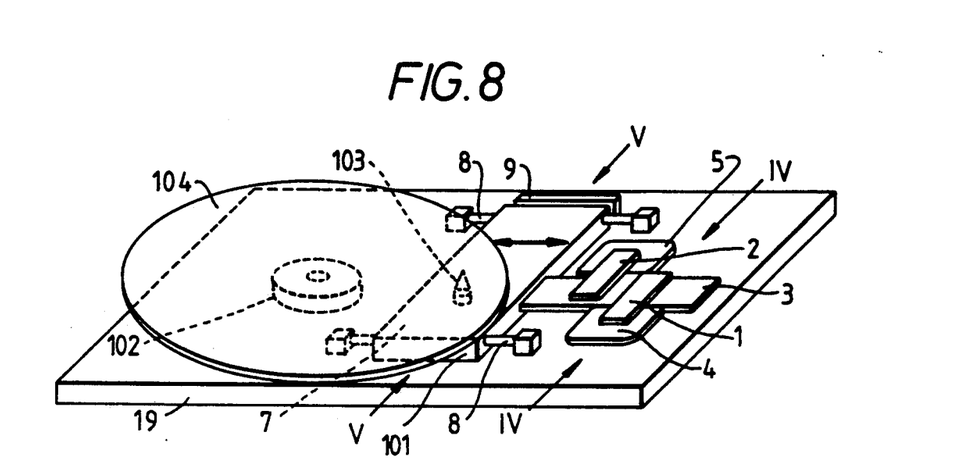
FIG. 8 shows an optical disk unit having a linear actuation of another embodiment of the present invention.

FIG. 8 shows an optical disk unit with a linear actuation of another embodiment of the present invention. This embodiment functions where it is impossible to provide stators of linear actuators and permanent magnets on both sides of the movable member 101.

A spindle motor 102 for rotating the optical disk 10 is installed on a base 19, whereas an optical head 7 is provided beneath the optical disk 104. The optical head 7 irradiates the optical disk with a light beam 103, so that data is recorded or reproduced. The optical head 7 is moved by a linear actuator according to the present invention in the radial direction of the optical disk 10 and the light beam 103 moves between optical disk tracks, thus allowing data to be recorded on or reproduced from the whole surface of the optical disk 104.

The linear actuator has a single track of permanent magnets which extends outwardly from the edge of the main body of the movable member 101 an A-phase stator core 1, a B-phase stator core 2, an A-phase coil 4 and an B-phase coil 5 are located at either the front or rear of the member 101 in the direction of movement. In order that the track of permanent magnets interacts with the stator cores 1,2 the A-phase coil 4 wound on the A-phase stator core 1 and the B-phase coil 5 wound on the B-phase stator core 2 are on the left- and right-hand side of the permanent magnets 3, respectively.

Figure 9A:
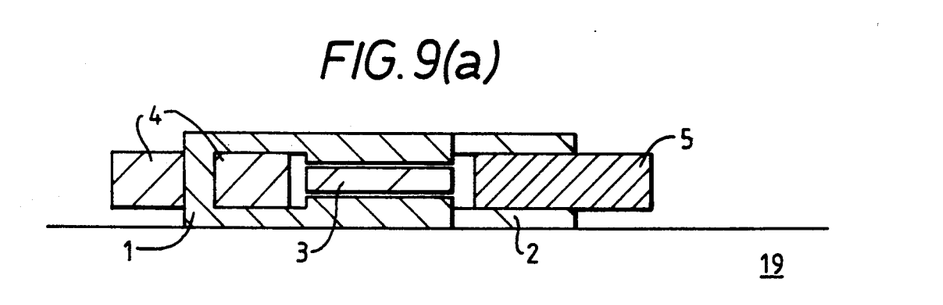
FIGS. 9(a) and 9(b) are sectional views of the linear actuator of FIG. 8.
Figure 9B:
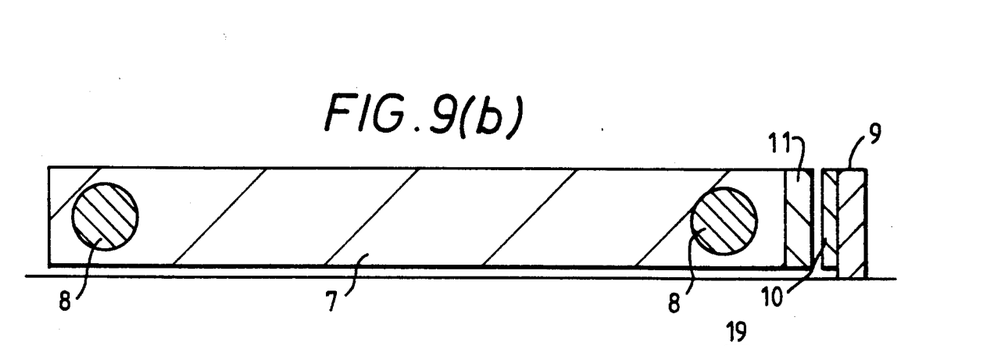

It can readily be seen from FIG. 9 that the use of a single track, and a suitable spacing of the coils 1, 2 which carry the pairs of sets of teeth, enable those cores 1,2 to overlap each other in the direction perpendicular to the direction of movement of the moveable member 101, although they are displaced in that direction. That displacement should be $(m \pm \frac{1}{4})T_p$, where n is an integer. In practice, provided the cores 1,2 are spaced from each other, the gap therebetween should be as small as possible to minimize the overall size of the linear actuator. It can be seen that, in this embodiment, the drive parts formed by the cores 1,2 and the drive coils 4,5 have a width transverse to the direction of movement of the movable member 101, which is less than the width of the main body of that movable member 101. As a result, it is the width of that main body 101, and the diameter of the disk 104, which determine the overall width of the disk unit. A particularly compact disk unit may therefore be provided.

Then, in the linear actuator of this embodiment of the present invention, the coil positions of the stators are prevented from interfering with each other. The stators can thereby be arranged close to each other, reducing the size of the disk unit.

FIG. 9(a) and 9(b) are sectional views of the linear actuator for moving the head in the embodiment of FIG. 8: FIG. 9(a) is a sectional view taken along line IV—IV of FIG. 8 and FIG. 9(b) a sectional view taken along line V—V thereof. A description will herein be given of the points which have not been referred to in FIG. 8.

There is a linear position sensor 10 on one side of the movable member 101. A magnetic plate 11 is joined to the side of the optical head 7 and a magnetic sensor 9 is secured to the base in such a way as to face the magnetic plate 11 with a very narrow gap therebetween.

As mentioned above, an advantage of this embodiment is that the device can be reduced as the area for installing the linear position sensor is reducible.

Figure 10:
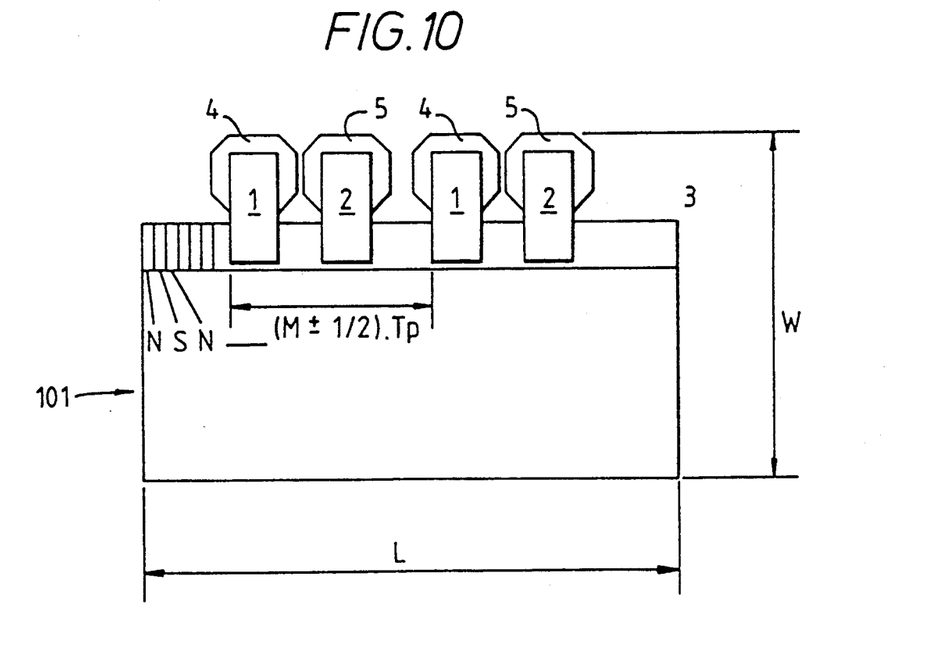
FIG. 10 shows a linear actuator of another embodiment of the present invention.

In all the above embodiments, there have been drive parts, comprising stator cores 1,2 and associated drive coils 4,5 on each side of the movable member 101. FIG. 10 shows another embodiment in which all the drive units are on the same side as the movable member 101, so that there may then be a single track of permanent magnets 3. The structure of the various parts of the embodiment of FIG. 10 may otherwise be identical to those in the earlier embodiments, and the same reference numerals are used to indicate corresponding parts. This embodiment has the advantage that the width W of the linear actuator is reduced, although there needs to be an increase in the length L of the movable member 101. For a disk drive unit, where the overall width is determined by the diameter of the disk, such an arrangement has little advantage. However, it may have advantage in other situations where the width of the actuator is otherwise a constraint on design. It may also be noted that, for a long stroke, it may be better to modify the embodiment of FIG. 10 so that the track of permanent magnets 3 is fixed, and the stator cores 1,2 and the associated coils 4,5 are mounted on a movable member.

Although the above embodiments have considered the application of the present invention to one type of optical disk unit, the present invention is applicable to another magnetic disk unit which is substantially similar in construction to optical disk units with the same effect. Moreover, as linear actuators according to the present invention can be rendered compact and thin, they may also be usable as high speed actuators for XY plotters and driving devices for moving a printed circuit board in both X and Y directions in chip mounters which automatically mount semiconductor devices on the printed circuit board.

The rigidity of the movable member 101 of the linear actuator may be high if only because the movable member 101 includes plate permanent magnets. Moreover, the magnetic pole tooth pitch and the magnetizing pitch for alternately magnetizing the N and S poles of the permanent magnet can be minimized as the core magnetic pole tooth pitch is proportional to the thrust constant. Hence, the disk unit is reducible in size as greater thrust is obtainable without increasing the weight and size of the movable part member 101. Furthermore, the teeth of the stator are arranged so that they face each other with a gap therebetween and only the track 151 of permanent magnets are located in the gap between the teeth thereof, whereby the movable member 101 may be even thinner and lighter.

With the use of such a linear actuator in a disk unit as a head feed mechanism, the whole disk unit may be small and light in weight and the use of lightweight movable parts enables quick responsive head movement. Moreover, as the movable member 101 supporting the head is highly rigid and as the linear actuator may have tracks on both sides thereof, the angular movement of the movable member 101 may be reduced with the effect of improving the accuracy of head positioning. Also, as two linear guides for supporting the head may be located substantially on the line connecting to the sides of the movable member 101, vibration in the direction of movement of the head is also suppressed. In addition, as a magnetic sensor may be used for detecting the head position, the unit may be made thinner than the embodiment employing an optical sensor. The thrust of the actuators is made constant by controlling the current flowing through the linear actuators according to the position detection signal with the effect of ensuring speedier, more accurate movement of the head.

What is claimed is:

1. A linear actuator comprising:
a first member including first and second drive parts;

a second member, movable relative to said first member in a first direction, having one track of permanent magnets extending in said first direction, said permanent magnets being arranged in such a manner that polarities of adjacent permanent magnets alternate, wherein each of said first and second drive parts of said first member comprise at least one pair of opposed sets of teeth and at least one corresponding drive coil for generating a variable magnetic polarity of said at least one pair of sets of teeth, each set of teeth extending in said first direction with said one track of permanent magnets of said second member being interposed between said sets of teeth, said drive coils of said first and second drive parts being on opposite sides of said second member; and linear guides for guiding said relative movement of said first and second members, said second member being located between said linear guides, wherein said first and second drive parts are further arranged such that, for any given relative position of said first and second members, magnetic alignment of said polarity of each of said at least one pair of sets of teeth of said first and second drive parts are out of phase with one another.

2. A linear actuator according to claim 1, wherein said at least one pair of sets of teeth of said first drive part and said at least one pair of sets of teeth of said second drive part are displaced a displacement distance of a non-integral multiple of the pitch of the teeth of each of said sets of teeth, thereby rendering magnetic alignment thereof to be out of phase.

3. A linear actuator according to claim 2, wherein said displacement distance is $(n \pm \frac{1}{2}) \cdot T_p$, where n is an integer and $T_p$ is said pitch of the teeth of said sets of teeth.

4. A linear actuator comprising:
a first member including first and second drive parts;
a second member, movable relative to said first member in a first direction, having at least one track of permanent magnets extending in said first direction, said permanent magnets being arranged such that magnetic polarities of adjacent permanent magnets alternate, wherein each of said first and second drive parts comprise at least one pair of opposed sets of teeth and at least one corresponding drive coil for generating a variable magnetic polarity of said at least one pair of sets of teeth, each set of teeth extending in said first direction with said at least one track of permanent magnets of said second member being interposed between said sets of teeth, said drive coils of said first and second drive parts being on opposite sides of said second member, said first and second drive parts being further arranged such that, for any given relative position of said first and second members, said at least one pair of sets of teeth of said first drive part and said at least one pair of sets of teeth of said second drive part are displaced a displacement distance which is a non-integral multiple of the pitch of the teeth of each of said sets of teeth, thereby rendering the alignment thereof out of phase, wherein said displacement distance is $(m \pm \frac{1}{2})T_p$, where m is an integer and $T_p$ is the pitch of said teeth of said sets of teeth, and wherein said at least one track of permanent magnets includes first and second tracks spaced apart in a direction perpendicular to said first direction, said first track being interposed between said at least one pair of sets of teeth of said first drive part and said second track being interposed between said at least one pair of sets of teeth of said second drive part.

5. A linear actuator according to claim 4, wherein, in order to provide said displacement distance, said at least one pair of sets of teeth of said first drive part are displaced in said first direction relative to said at least one pair of sets of teeth of said second drive part by said displacement distance.

6. A linear actuator according to claim 4, wherein, in order to provide said displacement distance, the respective polarities of said permanent magnets of said first track are displaced in said first direction relative to said respective polarities of the permanent magnets of said second track by said displacement distance.

7. A linear actuator comprising:
a first member including first and second drive parts; and
a second member, movable relative to said first member in a first direction, having one track of permanent magnets extending in said first direction, said permanent magnets being arranged in such a manner that polarities of adjacent permanent magnets alternate, wherein each of said first and second drive parts of said first member comprise at least one pair of opposed sets of teeth and at least one corresponding drive coil for generating a variable magnetic polarity of said at least one pair of sets of teeth, each set of teeth extending in said first direction with said one track of permanent magnets of said second member being interposed between said sets of teeth, said drive coils of said first and second drive parts being on opposite sides of said second member, and wherein said first and second drive parts are arranged such that, for any given relative position of said first and second members, magnetic alignment of said polarity of at least one pair of sets of teeth of said first drive part and magnetic alignment of said polarity of at least one pair of sets of teeth of said second drive part are out of phase by 180°.

8. A linear actuator comprising: a first member and a second member movable relative to said first member in a first direction;

said second member having at least one track of permanent magnets, said track extending in said first direction, said permanent magnets being arranged such that the magnetic polarities of adjacent permanent magnets are alternate; and said first member including first and second drive parts, each of said first and second drive parts comprising at least one pair of opposed sets of teeth and at least one corresponding drive coil for generating a variable magnetic polarity of said at least one pair of sets of teeth, each set of teeth extending in said first direction with said track of permanent magnets of said second member being interposed between said sets of teeth;

wherein said first and second drive parts are arranged such that, for any given relative position of said first and second members, the magnetic alignment of said polarity of at least one pair of sets of teeth of said first drive part with said at least one track and the magnetic alignment of said the polarity at least one pair of sets of teeth of said second drive part with said at least one track are out of phase by 180°.

9. A linear actuator according to claim 8, wherein said at least one track of permanent magnets includes first and second tracks displaced in a direction perpendicular to said first direction, said first track being interposed between said at least one pair of sets of teeth of said first drive part and said second track being interposed between said at least one pair of sets of teeth of said second drive part.

10. A linear actuator according to claim 9, wherein the physical alignment of said at least one pair of sets of teeth of said first drive part with said at least one track and the physical alignment of said at least one pair of sets of teeth of said second drive part with said at least one track are displaced a displacement distance which is $(m\pm\frac{1}{2}) \cdot T_p$, where m is an integer and $T_p$ is the pitch of the teeth of each of said sets of teeth, thereby rendering the magnetic alignment thereof to be out of phase by 180°.

11. A linear actuator according to claim 10, wherein said at least one track of permanent magnets includes first and second tracks displaced in a direction perpendicular to said first direction, said first track being interposed between said at least one pair of sets of teeth of said first drive part and said second track being interposed between said at least one pair of sets of teeth of said second drive part.

12. A linear actuator according to claim 11, wherein, in order to provide said displacement distance, said at least one pair of sets of teeth of said first drive part are displaced in said first direction relative to said at least one pair of sets of teeth of said second drive part by said displacement distance.

13. A linear actuator according to claim 11, wherein, in order to provide said displacement distance, the magnetic polarities of the permanent magnets of said first track are displaced in said first direction relative to the magnetic polarities of the permanent magnets of said second track by said displacement distance.

14. A linear actuator according to claim 8, wherein the drive coils of said first and second drive parts are located at the same side of said second member.

15. A linear actuator according to claim 14, wherein the at least one pair of opposed sets of teeth of the first and second drive parts act on the same track of said at least one track.

16. A linear actuator according to claim 8, wherein each of said first and second drive parts comprises two of said pairs of sets of teeth and two corresponding drive coils.

17. A disk unit comprising:
a disk support means for supporting a disk for rotation about an axis of rotation;
a head for interacting with said disk; and
a head feed mechanism for moving said head linearly relative to said axis of rotation, said head feed mechanism comprising a first member fixed relative to said axis of rotation and a second member supporting said head,
said second member having one track of permanent magnets, said track of permanent magnets extending in said first direction, said permanent magnets being arranged such that the magnetic polarities of adjacent permanent magnets alternate;
two linear guides for guiding said relative movement of said first and second members, said second member being located between said linear guides;
said first member including first and second drive parts each of said first and second drive parts comprising at least one pair of opposed sets of teeth and at least one corresponding drive coil for generating a variable magnetic polarity of said at least one pair of sets of teeth, each set of teeth extending in said first direction with said at least one track of permanent magnets of said second member being interposed between said sets of teeth the drive coils of said first and second drive parts being on opposite sides of said second member;
wherein said first and second drive parts are arranged such that, for any given relative position of said first and second members, magnetic alignment of said polarity of at least one pair of sets of teeth of said first drive part with said at least one track and magnetic alignment of said polarity of at least one pair of sets of teeth of said second drive part with said at least one track are out of phase.

18. A disk unit comprising a disk support means for supporting a disk, a head for interacting with the disk, and a head feed mechanism for moving said head linearly relative to said axis of rotation, said head feed mechanism comprising a first member fixed relative to said axis of rotation and a second member supporting said head;
said second member having at least one track of permanent magnets, said track extending in said first direction, said permanent magnets being arranged such that the magnetic polarities of adjacent permanent magnets are alternate; and
said first member including first and second drive parts
each of said first and second drive parts comprising at least one pair of opposed sets of teeth and at least one corresponding drive coil for generating a variable magnetic polarity of said at least one pair of sets of teeth each set of teeth extending in said first direction with said track of permanent magnets of said second member being interposed between said sets of teeth;
wherein said first and second drive parts are arranged such that, for any given relative position of said first and second members, the magnetic alignment of said the polarity of at least one pair of sets of teeth of said first drive part with said at least one track and the magnetic alignment of said the polarity at least one pair of sets of teeth of said second drive part with said at least one track are out of phase by 180°.

19. A graphical plotter comprising:
a fixed body;
a movable head;
a head movement mechanism for moving said head relative to the body, said head movement mechanism comprising a first member fixed to said fixed body and a second member supporting said head;
said second member having one track of permanent magnets, said track extending in said first direction, said permanent magnets being arranged such that magnetic polarities of adjacent permanent magnets alternate, and said first member including first and second drive parts, each of said first and second drive parts comprising at least one pair of opposed sets of teeth and at least one corresponding drive coil for generating a variable magnetic polarity of said at least one pair of sets of teeth, each set of teeth extending in said first direction with said one track of permanent magnets of said second member being interposed between said sets of teeth the drive coils of said first and second drive parts being on opposite sides of said second member;

wherein said first and second drive parts are arranged such that, for any given relative position of said first and second members, magnetic alignment of said polarity of at least one pair of sets of teeth of said first drive part and magnetic alignment of said the polarity at least one pair of sets of teeth of said second drive part are out of phase by 180°.

20. A semiconductor mounting device comprising:

a chip support device for a semiconductor chip;

a printed circuit board support; and board support means for moving said printed circuit board relative to said chip support device, said board support means comprising a first member fixed relative to said chip support device and a second member for moving said printed circuit board support;

said second member having one track of permanent magnets, said track extending in said first direction, said permanent magnets being arranged such that magnetic polarities of adjacent permanent magnets alternate; and said first member including first and second drive parts each of said first and second drive parts comprising at least one pair of opposed sets of teeth and at least one corresponding drive coil for generating a variable magnetic polarity of said at least one pair of sets of teeth, each set of teeth extending in said first direction with said at least one track of permanent magnets of said second member being interposed between said sets of teeth the drive coils of said first and second drive parts being on opposite sides of said second member;

wherein said first and second drive parts are arranged such that, for any given relative position of said first and second members, magnetic alignment of said polarity of at least one pair of sets of teeth of said first drive part and magnetic alignment of said polarity of at least one pair of sets of teeth of said second drive part with said at least one track are out of phase by 180°.

21. The graphical plotter according to claim 19 further comprising two linear guides for guiding relative movement of said first and second members, said second member being located between said linear guides.

22. The semiconductor mounting device according to claim 20 further comprising two linear guides for guiding relative movement of said first and second members, said second member being located between said linear guides.

* * * * *